United States Patent [19]

Thompson

[11] Patent Number: 4,662,972
[45] Date of Patent: * May 5, 1987

[54] METHOD OF FORMING A NON-SKID SURFACED STRUCTURE

[76] Inventor: Thomas L. Thompson, 1645 Monrovia St., Costa Mesa, Calif. 92627

[*] Notice: The portion of the term of this patent subsequent to Nov. 26, 2002 has been disclaimed.

[21] Appl. No.: 715,919

[22] Filed: Mar. 25, 1985

Related U.S. Application Data

[63] Continuation-in-part of Ser. No. 580,839, Feb. 16, 1984, Pat. No. 4,555,292.

[51] Int. Cl.$^4$ .............................................. B32B 31/00
[52] U.S. Cl. ..................................... 156/279; 52/181; 52/811; 114/263; 156/258; 156/295; 156/315; 156/330; 238/14; 404/19; 427/202; 427/203; 427/205; 428/143; 428/212; 428/328
[58] Field of Search ............... 156/279, 295, 257, 315, 156/258, 330; 428/143, 328, 212; 427/202, 205, 203; 52/181, 811; 114/263; 238/14; 404/19

[56] References Cited

U.S. PATENT DOCUMENTS 2,009,595  7/1935  Van Der Pye .................... 52/181
3,334,555  8/1967  Nagin et al. ..................... 427/202
3,352,955  11/1967 Pigott et al. ..................... 156/330
4,555,292  11/1985 Thompson ........................ 156/279

FOREIGN PATENT DOCUMENTS 50-8479   4/1975  Japan .............................. 156/279
1560692   2/1980  United Kingdom ............. 52/181

Primary Examiner—John J. Gallagher
Attorney, Agent, or Firm—Price, Gess & Ubell

[57] ABSTRACT

The present invention defines methods of forming a non-skid surface on a base member, wherein the base member may consist of a wood, plastic, metal or concrete surface structure. One method includes applying one or more coats or layers of epoxy resin to one surface of a wood base member. After the epoxy resin is set, a first coat of polyurethane is applied thereover at a thickness determined by the size of the grit material that is disseminated in the first coat of polyurethane, whereby the upper portion of the grit is exposed so as to be covered by a second polyurethane coat applied over the first coat of polyurethane, the grit being locked within and between the two coats of polyurethane. An additional method includes the step of affixing a fiber/cement panel to the base member and applying the first polyurethane coat to the surface of the fiber/cement panel, followed thereafter by the grit and the second coat of polyurethane, whereby a non-skid surface is established thereon.

10 Claims, 7 Drawing Figures

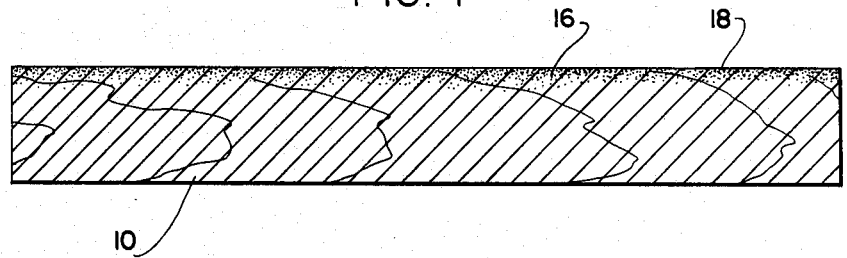
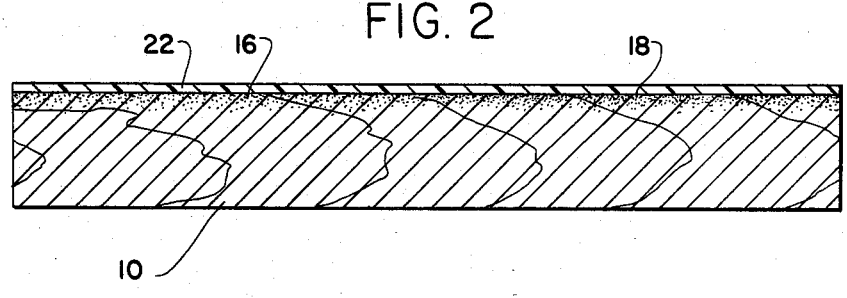
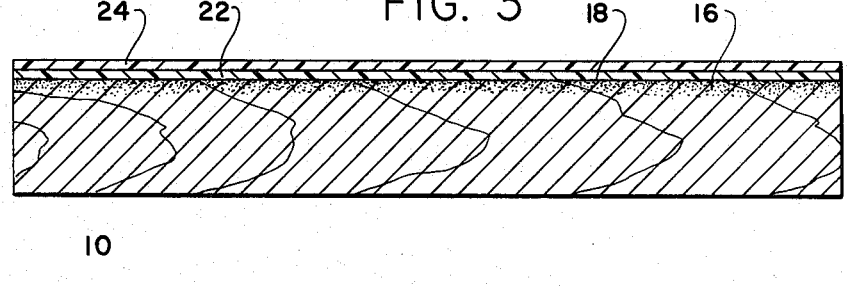
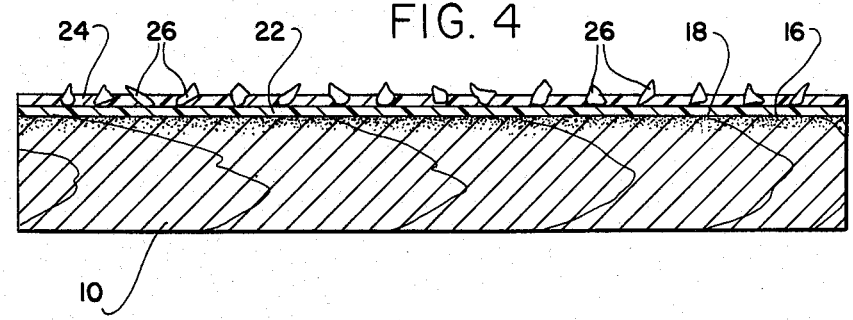

METHOD OF FORMING A NON-SKID SURFACED STRUCTURE

CROSS-REFERENCE TO RELATED APPLICATION:

This is a continuation-in-part of pending application Ser. No. 06/580,839 filed Feb. 16, 1984, now U.S. Pat. No. 4,555,292.

BACKGROUND OF THE INVENTION

1. Field of the Invention

This invention relates to a structural panel or base member, and more particularly to a base member formed from plywood, metal or plastic that is processed so as to establish a unique method of forming a non-skid surface, wherein the finished produce provides a weatherproof and wear-resistant, non-skid-surfaced structure for areas subjected to heavy foot traffic and are generally exposed to damp, wet environments.

2. Description of the Prior Art

The invention as disclosed herein is particularly suitable for solving various and difficult problems associated with surface structures which are designed for heavy pedestrian traffic, especially with respect to those surfaces associated with marine-dock systems and their surrounding structures. Several types of walking surfaces have been employed for this purpose, but with limited success. At present, there are two widely used surface materials, one being made from wood products and the other being constructed from relatively thin concrete or cement slabs. Wood surfaces are generally formed from a multiplicity of juxtaposed plank members positioned transversely across the deck or walkway.

A dock structure or walkway formed from cement slabs is usually defined by elongated, rectangular slab members having a thickness of from one to two inches. Even though cement surfaces are becoming more popular over wood surfaces in the construction of marinas and related floating-dock structures, there are two inherent problems that prevail. One of these is that concrete slabs are very heavy and add considerable weight to an already large and heavy structure, making them cumbersome and difficult to handle; and the other is that cement slabs used for dock fingers and walkways are not resilient, and have a tendency to crack when subjected to twisting and flexing in turbulent water caused by adverse weather conditions.

Hence, it can be readily understood from the following disclosure of the present invention that, when the end product thereof is employed, the above-mentioned problems are overcome.

SUMMARY AND OBJECTS OF THE INVENTION

The present invention has for an important object to provide a new and unique method of forming a non-skid-surfaced structure that can be readily employed as a structural walkway or decking for marinas and like areas.

Another object of the present invention is to provide a method of forming a non-skid-surfaced wood, metal or plastic structure that is lightweight and wear-resistant, and capable of allowing heavy pedestrian traffic, while eliminating the above-mentioned problems that are inherent in the known surface structures.

Still another object of the invention is to provide a non-skid, plywood, panel structure that is lightweight, durable and resilient, so that it can flex without cracking.

A further object of the invention is to provide a non-skid-surfaced, metal base member defining a tile-like structure that is lightweight and durable.

Yet a further object of the present invention is to provide a non-skid-surfaced, plastic base member defining a tile-like structure that is also lightweight and durable, and allows complete flexibility of the tile without causing cracking or peeling of the non-skid surface.

A still further object of the invention is to provide a non-skid-surfaced, base member wherein the upper surface of the base member is formed having a crown to allow for drainage of liquids, rainwater, etc.

Another object of the invention is to provide a non-skid-surfaced plywood structure wherein the plywood is sealed on at least one surface by applying a low-viscosity coat of catalyzed epoxy resin which is allowed to soak into the wood fibers. Immediately following the first application, a second coat of thickened epoxy resin of approximately 20 to 30 mils is applied. This coat is allowed to dry for approximately one hour, whereupon a third or intermediate coat of pigmented polyurethane is then applied to the epoxy surface. While this third or intermediate coat is still quite wet, and before it develops a skin, a very hard grit material such as aluminum oxide is evenly broadcast over the wet surface. The grit is provided with the proper coarseness so as to establish a sandpaper-like surface. In order to establish a positive restraint, a finish coat or layer is applied over the grit particles and the intermediate coat, thus preventing the loosely embedded particles from separating from the base member.

A still further object of the invention is to provide a method of this character that can be used for forming a non-skid surface on a base structure that can be readily employed either as a permanent or a temporary walkway for pedestrian traffic at building sites, and for replacement and/or repair of worn walkways or decks that would otherwise need to be reconstructed.

Other features, objects and advantages of the instant invention will be obvious to persons skilled in the art from the following detailed description of several embodiments, accompanied by the attached drawings, in which identical reference numerals will refer to like parts in the various views.

BRIEF DESCRIPTION OF THE DRAWINGS

Referring more particularly to the accompanying drawings, which are for illustrative purposes only:

FIG. 1 is a cross-sectional view of a wood base member, indicating the first step of applying a thin viscous coat of sealer material;

FIG. 2 is a cross-sectional view of the wood base member, illustrating the second step of applying a thickened coat of an epoxy material;

FIG. 3 is still another similar cross-sectional view, showing a third step whrein a third or intermediate thick coat is applied thereto;

FIG. 4 is another cross-sectional view, illustrating the step of applying a grit material to the surface of the intermediate coat;

DESCRIPTION OF THE PREFERRED EMBODIMENT

Figure 5:
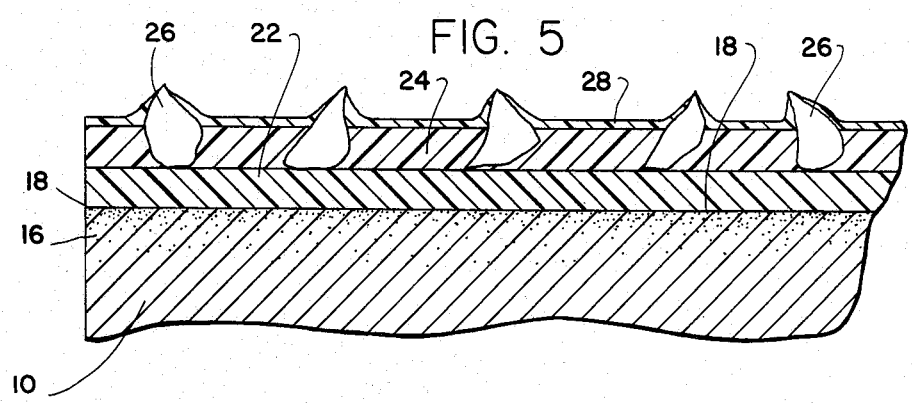
FIG. 5 is an enlarged, cross-sectional view, showing a grit-restraint coat applied over the grit and intermediate coat thereof.

Referring more particularly to FIGS. 1 through 4, there are shown enlarged, cross-sectional views representing a non-skid-surfaced panel or base member 10 illustrated in such a manner as to indicate sequentially the several necessary steps for producing the non-skid-surfaced structure.

As previously mentioned heretofore, there are several areas of application for which the present invention is well suited, even though its main purpose is to establish a non-skid decking in and about waterfront areas or related environments, and more particularly in connection with decking for marine-dock structures. However, it is readily apparent that, after understanding the end results of the present invention and its unique advantages, other uses for floorings, walkways, and even roadways, can be established.

FIG. 1 shows a wood panel or base member 10 which is formed preferably from a plywood structure having a thickness of between ¼" to 2½", with a specification requiring 1⅛" thick Grade CC exterior plywood panel which is pressure-preservative treated.

It is important to note, however, that other wood products, such as planks, boards, etc., can be substituted for the plywood which is used in the description because it is considered to be the preferred embodiment of the present invention.

The purpose of the particular method of forming the end product of the non-skid-surfaced structure is to provide a permament but flexible bonding between the wood base member 10 and the non-skid elements thereof. Accordingly, the first embodiment as shown in FIGS. 1 through 4 comprises a wood base member having preferably a generally rectangular configuration, and having the approximate dimensions of a typical 4'×8' panel. It is contemplated templated that the base member be also formed with 12"×12" tile.

Once the wood base member is selected and defined, a coat of catalyzed epoxy resin 16 having a low viscosity is applied to the upper surface 18 of the base member 10. In other words, a catalyzed epoxy resin, indicated by the dots 16, must be applied in a thin liquid state, so as to penetrate within the surfaces 18, thus soaking into the wood fibers and readily sealing the surfaces thereof.

The next step is to immediately apply a second coat of the same type of catalyzed epoxy resin. However, this second coat 22 is much thicker in viscosity and is formed having a thickness of between 10 to 30 mils. In order to aid in the bonding strength of epoxy layer 22, there is added thereto a sufficient amount of ground fiberglass (cabosil) which moreover provides a controlled viscosity of the epoxy resin. The second coat 22 is applied only to surface 18, which defines the upper or outer surface, and is then allowed to harden together with the first thin coat 16. Thus, a very strong bond is established between the second thick coat 22 and the saturated wood fibers on surface 18. The time required for the hardening of the second coat 22 can vary, but generally it takes about one hour to dry hard under normal, ambient, room temperature, although the base member at this time can, if desired, be subjected to a predetermined controlled temperature, whereby the hardening time will be set under a selective temperature-controlled environment.

After the hardening of second coat 22, the surface thereof is roughened by any suitable means such as sanding, and a third coat 24 is then applied. This coat is preferably a pigmented polyurethane material that is spread or rolled over coat 22 and is applied having a thickness of between 10 to 40 mils, but preferably 30 mils, and having a viscosity of between 1100 and 1400 centipoise. The thickness of this coat is normally determined by the size and type of abrasive material that is combined therewith, the grit size being between No. 30 and No. 60. That is, while the polyurethane coat 24 is still very wet, and before it develops a skin-like surface, an overlay of very hard grit material 26 is evenly spread or disseminated over the wet layer of polyurethane. It is preferred that grit 26 be a No. 46 size of aluminum oxide, whereby a 30-mil thickness to layer 24 would be achieved so as to allow the very sharp edges of the aluminum-oxide, sand-like particles to extend slightly above the surface of coat 24. Thus, the greater part of each grit particle is submerged and held in place by the proper thickness of the polyurethane material. It should be noted that other grit materials can also be used as an overlay under specific environmental conditions. Various materials such as silica sand and crushed walnut shells can be employed to provide a non-skid coating base.

It is important to note that the grit substance 26 is disseminated over and in the polyurethane material, and is not physically secured within the second coat of epoxy layer 22. When grit particles 26 are supported in an epoxy base, such as at 22, they start to separate from the epoxy as it becomes brittle when exposed to ambient environmental conditions. Thus, the second coat of epoxy establishes a means by which the polyurethane coat 24 can be positively secured to the base member, particularly when the base member comprises a wood product, such as plywood. Polyurethane coat 24 further provides a means to protect the epoxy layer 22 from ultraviolet degredation.

Due to extensive research, it was found that the surface tension of the first coat of polyurethane prevents some of the grit particles from sinking into the polyurethane coat far enough to be fixedly locked in place. Accordingly, a thin final coat or layer 28 of polyurethane is applied over the grit particles and polyurethane, so as to establish a positive securing means to prevent any of the grit particles 26 from separating from the structure. The finish coat 28 is thinly spread and has a viscosity of between 610 to 700 centipoises. This is clearly illustrated in the enlarged cross-sectional view of FIG. 5. The first coat of polyurethane 24 should have the proper thickness to cover only one-half to two-thirds of the grit particles, thus allowing the majority of the particles to settle and rest somewhat on epoxy layer 22. The finish coat is a much thinner layer which, when applied, covers layer 24 and encapsulates the remaining, upper, exposed portion of each grit particle.

Figure 6:
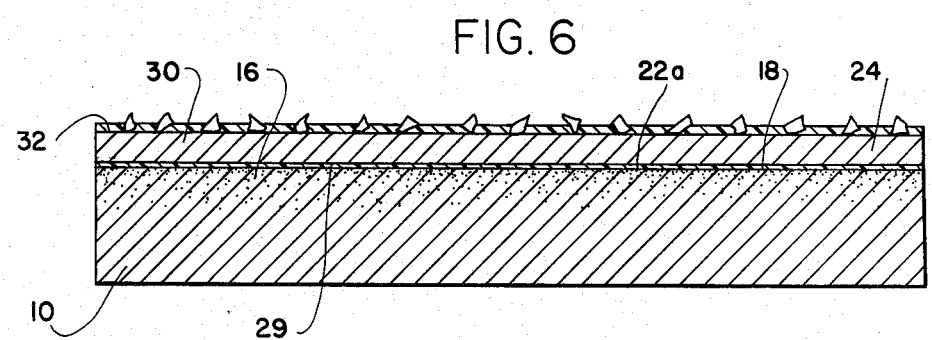
FIG. 6 is a cross-sectional view of an alternative embodiment of the present invention wherein a sheet of fiber/cement material is interposed between the thickened coat of epoxy and the intermediate coat.
Figure 7:
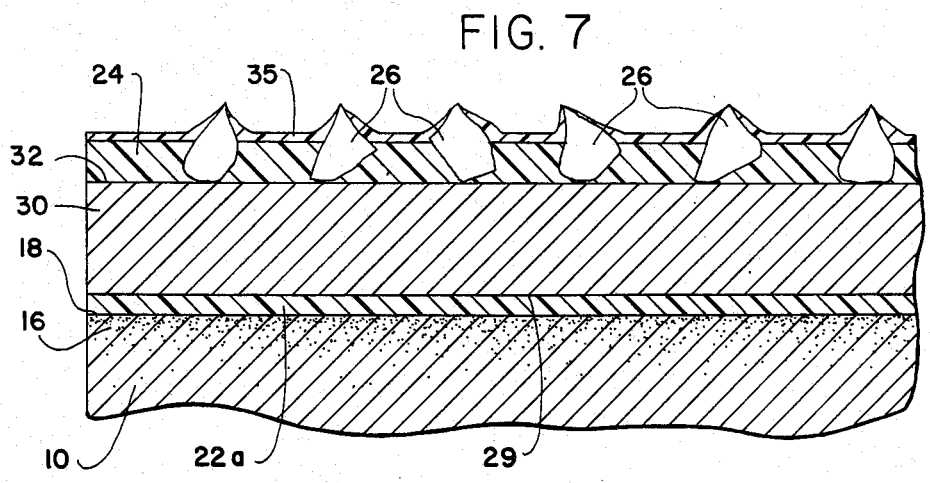
FIG. 7 an enlarged, cross-sectional view, showing the finished arrangement of the alternative embodiment of FIG. 6.

A second embodiment is disclosed in FIGS. 6 and 7, wherein a fiber/cement panel 30 having the same flat rectangular configuration as that of plywood panel 10 is placed over the second epoxy layer 22, thereby bonding opposing surface the fiber/cement panel to the plywood panel. The fiber/cement panel 30 is relatively thin and has a thickness of approximately ⅜". This panel generally consists of 36 percent Portland cement; 30 percent crushed limestone; 20 percent Possolan Volcanic ash; and 14 percent suitable fiber approximately ⅝" long. This particular composition is highly resistant to salt corrosion, has excellent chemical and fire resistance, and has resilient qualities to prevent cracking when subjected to constant movement, particularly when used as a walk surface on a floating-dock structure supported in a body of water, in which case the panels bend and twist to some extent.

Accordingly, the following additional steps are required when the fiber/cement panel is employed:

After applying the second coat of thicker cabosil-epoxy resin 22 to the plywood surface 18, this same thicker resin is also applied to the underside 29 of the fiber/cement panel 30. While both fiberglass-epoxy resin coats are still wet, the fiber/cement panel 30 is positioned over the plywood panel, allowing the two epoxies to commingle as one coating 22a.

At this time, the two attached panels 10 and 30 are placed in a press, whereby approximately 100 p.s.i. pressure is applied, thus forcing out the excess epoxy material and establishing a very thin bonding line between the two panels.

Once this is accomplished, a first polyurethane coat 24 is applied to the upper surface 32 of panel 30. Again, the thickness of the coat is determined by the size and type of abrasive material that is applied thereafter.

Accordingly, the polyurethane coat 24 is allowed to dry as previously described, at which time a second (finish) coat of polyurethane 35 is applied, so as to lock the abrasive particles in place. The second coat will further cover the grit surfaces to the level where only the top points of the grit are protruding from the surface, or the points might be slightly covered in the case of lower-lying grit particles. The second coat will trap any loose grit that, for some reason, might not be well fastened into the first coat. A second benefit is derived from employing a second finished polyurethane coat—which is that the color of the surface can be precisely controlled by selective pigmentation.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A method of forming a non-skid-surfaced plywood panel having a permanent but flexible bond between said plywood and the non-skid elements thereof, wherein the method comprises the steps of:
   providing a sheet of plywood having a substantially flat surface;
   applying to said surface thereof a first coat of low-viscosity, catalyzed, epoxy resin so as to penetrate and seal said surfaces;
   applying a second coat of a catalyzed epoxy resin to said surface of said plywood panel prior to the drying of said first coat of epoxy resin, said second coat having a higher viscosity than said first coat;
   providing a fiber/cement panel having substantially the same configuration as said plywood panel;
   applying a third coat consisting of the same catalyzed epoxy resin used in said second coat to one surface of said fiber/cement panel;
   placing said coated surfaces of each panel into opposing engagement with each other;
   applying pressure to said panels, whereby excess epoxy material is forced from between said panels;
   allowing said epoxy between said panels to dry;
   applying at a predetermined thickness a first coat of polyurethane material to form a surface layer over the exposed surface of said fiber/cement panel;
   disseminating a hard grit material over said first coat while said polyurethane material is still in a wet stage, said grit material being of a size greater than the thickness of said first coat, so as to allow a portion of said grit to be exposed above the surface of said first coat;
   allowing said first polyurethane coat to dry; and
   applying a second coat of polyurethane material over said first coat of polyurethane material so as to encapsulate said grit material, whereby said grit material is secured to said fiber/cement panel.

2. A method as recited in claim 1, wherein said first coat of polyurethane has a viscosity of between 1100 and 1400 centipoise, and said second coat of polyurethane has a viscosity of between 610 and 700 centipoise.

3. A method as recited in claim 1, wherein said first coat of said polyurethane is applied having a thickness less than the size of said grit material, whereby the grit particles of said grit material are at least one-third exposed, and said second polyurethane coat covers the exposed portion of said grit particles.

4. A method of forming a non-skid-surface to a base member, wherein grit particles are fixedly secured, the method comprising the steps of:
   providing a base member having a substantiallly flat surface;
   adhesively bonding a fiber/cement panel to said base member;
   applying a first coat of polyurethane to the exposed surface of said fiber/cement panel, said first coat of polyurethane having a predetermined thickness;
   disseminating hard grit particles over said first coat while said polyurethane is still in a wet stage, said grit particles being formed having a size greater than the thickness of said first coat, so as to allow a portion of said grit particles to be exposed above the surface of said first coat;
   allowing said first polyurethane coat to dry; and
   applying a second coat of polyurethane over said first coat thereof, so as to encapsulate said grit particles within said first and second coats of polyurethane, whereby said grit particles are fixedly secured to said fiber/cement panel.

5. A method as recited in claim 4, wherein said fiber/cement panel consists of:
   36 percent Portland cement;
   30 percent crushed limestone;
   20 percent Possolan volcanic ash; and
   14 percent fibrous material.

6. A method as recited in claim 5, wherein said predetermined thickness of said first coat of polyurethane covers between one-half to two-thirds of said grit particles.

7. A method as recited in claim 5, wherein said first coat of polyurethane has a viscosity of between 1100 to 1400 centipoise, and wherein said second coat thereof has a viscosity of between 610 to 600 centipoise.

8. A method as recited in claim 5, wherein said base member consists of plywood.

9. A method as recited in claim 5, wherein said base member consists of metal.

10. A method as recited in claim 5, wherein said base member consists of plastic.

* * * * *

UNITED STATES PATENT AND TRADEMARK OFFICE
CERTIFICATE OF CORRECTION

PATENT NO.   : 4,662,972

DATED        : May 5, 1987

INVENTOR(S)  : Thomas L. Thompson

It is certified that error appears in the above-identified patent and that said Letters Patent is hereby corrected as shown below:

Column 1, line 17, delete "produce" and insert --product--.

Column 2, line 61, delete "whrein" and insert --wherein--.

Column 3, line 39, delete "permament" and substitute --permanent--.

Column 3, line 45, delete "templated".

Signed and Sealed this

Eighth Day of March, 1988

Attest:

DONALD J. QUIGG

*Attesting Officer*  *Commissioner of Patents and Trademarks*